Figure 1:
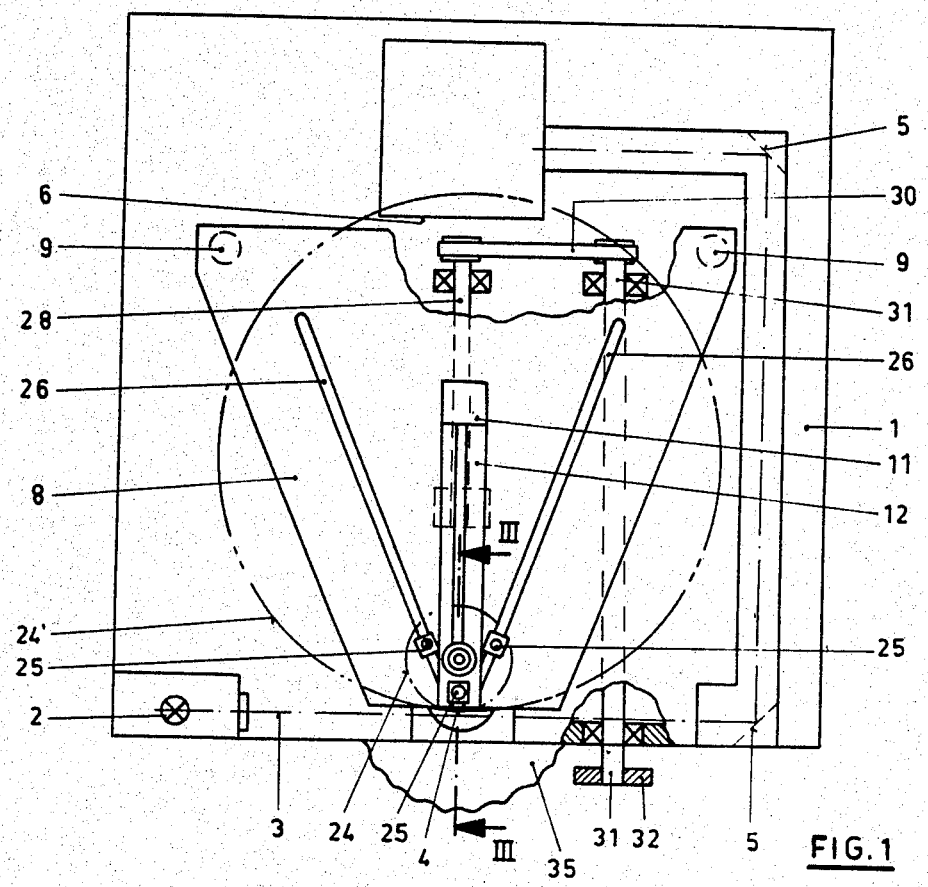

United States Patent [19]

Gebhardt

[11] Patent Number: 4,529,344
[45] Date of Patent: Jul. 16, 1985

[54] SETTING DEVICE FOR CUTTER HEADS

[75] Inventor: Wolfgang Gebhardt, Sindelfingen, Fed. Rep. of Germany

[73] Assignee: Santrade Ltd., Lucerne, Switzerland

[21] Appl. No.: 504,043

[22] PCT Filed: Sep. 11, 1982

[86] PCT No.: PCT/EP82/00197
§ 371 Date: May 12, 1983
§ 102(e) Date: May 12, 1983

[87] PCT Pub. No.: WO83/00831
PCT Pub. Date: Mar. 17, 1983

[30] Foreign Application Priority Data

Sep. 12, 1981 [DE] Fed. Rep. of Germany ....... 3136185

[51] Int. Cl.³ .............................................. B23C 9/00
[52] U.S. Cl. ..................................... 409/218; 73/104; 356/391; 409/63
[58] Field of Search .................... 409/63, 218; 408/16; 73/104; 356/391, 392, 373, 375; 33/185 R, 201

[56] References Cited

U.S. PATENT DOCUMENTS 3,582,214 6/1971 Loomis ............................ 73/104 X

FOREIGN PATENT DOCUMENTS 1627041 5/1970 Fed. Rep. of Germany ...... 409/218
2049419 4/1972 Fed. Rep. of Germany ........ 73/104
2302817 10/1976 France ................................. 409/218
 298824 10/1965 Netherlands ........................ 356/391
2045652 11/1980 United Kingdom ................ 409/218

OTHER PUBLICATIONS

How to Preset Tools, American Machinist Special Report No. 531, pp. 131-142, Nov. 1962.

Primary Examiner—William R. Briggs
Attorney, Agent, or Firm—Burns, Doane, Swecker & Mathis

[57] ABSTRACT

To set the proper location of a cutting bit, an optical scanner directs an optical beam toward a screen. The scanner is mounted on a base frame. The cutting bit is mounted on a cutting head holder which is, in turn, mounted on a support stage, the latter being vertically adjustable on the base frame. The cutting head holder is adjustable relative to the support stage and the measuring point. The support stage carries three support bodies for the rear side of the cutter head holder.

11 Claims, 7 Drawing Figures

SETTING DEVICE FOR CUTTER HEADS

The invention concerns a setting device for cutter heads with a rotatingly mounted cutter head holder, a base support frame and an optical scanning apparatus with a projection screen to detect the profile of one cutting edge at a measuring point.

Setting devices of this type are used for the setting of cutter heads, in particular of multiple edge milling tools with individually adjustable cutting bits.

In known setting devices, the cutter head holder is mounted on a rotatingly supported spindle, fixedly mounted on the frame. The optical scanning apparatus is adjustable, so that the measuring point, which corresponds to the zero point of a graticule on the projection screen, may be brought into a definite initial position with respect to the axis of rotation of the cutter head.

The unavoidable rotational inaccuracy of the cutter head holding spindle has a considerable effect on the rotating accuracy and the axial run-out accuracy of the cutter head detected and scanned. In the case of axial run-out accuracies of the order of magnitude of 0.001 mm, which is often required, these known setting devices no longer yield satisfactory results. Furthermore, the measuring point, in which simultaneously the setting of the individual cutting bits must also be effected, is accessible with difficulty only.

It is therefore the object of the invention to provide a setting device of the aforementioned type, whereby the axial runout error caused by a holder spindle or the like, is extensively avoided. Simultaneously, the measuring point should be readily accessible for the adjustment of cutting edges. The device should have a simple and stable configuration.

This object is attained according to the invention by the following characteristics:

(a) the optical scanning apparatus is arranged in the base mounting frame stationarily with respect to the frame and with an approximately horizontal direction of the optical beam;

(b) a holding stage is guided in the base frame in a height adjustable manner;

(c) the rotatable cutter head holder is displaceable in the holding piece with respect to the measuring point;

(d) the holding stage carries three support bodies for the rear side of the cutter head.

The rotatable cutter head holder here serves only to determine the radial position of the cutter head and to make possible the rotating motion between the individual setting processes. The axial run-out setting, which is increasing in importance in the adjustment of the cutter head and which has very accurate requirements, is determined not by the rotating accuracy and the axial run-out accuracy of the rotatable cutter head holder, but by the position of the three support bodies, resting against the rear side of the cutter head. This takes into account the fact that this rear side of the cutter head forms the supporting surface of the cutter head on the frontal surface of the support flange of the machine tool. The axial run-out accuracy of the cutter head is thus determined by the position of the edges with respect to the said rear side of the cutter head. The supporting of the rear side of the cutter head by three supporting bodies renders it possible to sight the cutter head with a very high accuracy in the setting device, without a potential axial run-out error or rotating error of the rotating cutter head holder affecting the axial run-out accuracy of the cutter head. A further increase in the accuracy and simplification of the configuration of the apparatus is obtained by the stationary mounting of the optical scanning apparatus. The necessary radial end axial setting of the milling tool to be scanned in relation tn the measuring point is effected by that the support stage is adjustable in height in the base frame at least within the range of the measuring point and that the cutter head holder is displaceable with respect to the support stage. The measuring point, at which the cutting bit setting is also accomplished, is located in a readily accessible position on the front side of the setting device.

According to an especially advantageous form of embodiment of the concept of the invention, it is provided that the rotatable cutter head holder and at least two of the three support bodies are guided displaceably in the support stage. This makes it possible in a very simple manner and without interfering with accuracy, the resetting of cutter heads with different diameters within a very large diameter range, without the need for appreciably increasing the dimensions of the setting device. The measuring point remains well accessible, as it remains at the same location in the instrument.

For adaptation to cutter heads of different thicknesses, different bore diameters and/or different overall configurations (single piece construction or divided configuration with a support body and a replaceable cutter head ring), the rotating cutter head holder and/or the support bodies may be interchangeable in a further development of the concept of the invention, wherein for example support bodies of different heights may be used.

Further advantageous embodiments of the inventive concept are the object of the dependent claims.

The invention will become more apparent from the examples of embodiment shown in the drawing attached hereto.

Figure 2:
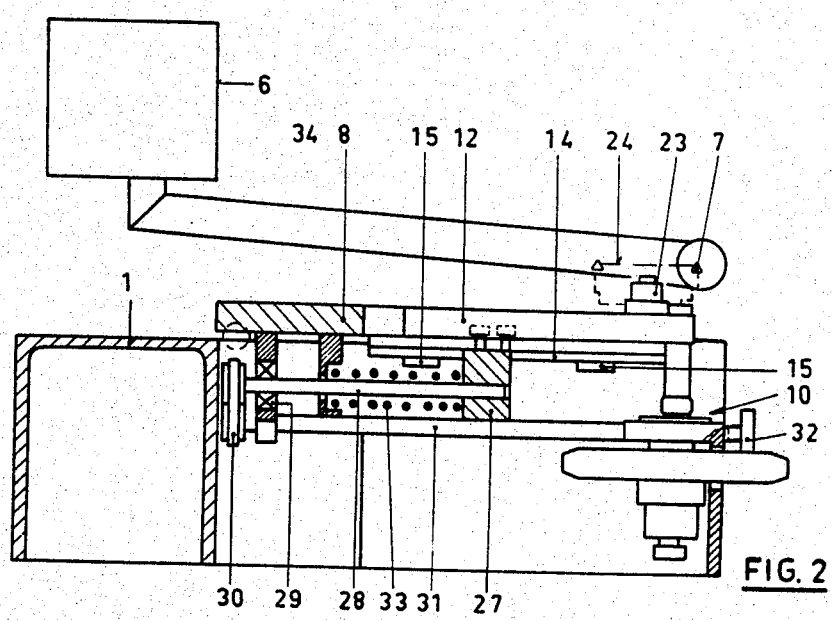
Figure 3:
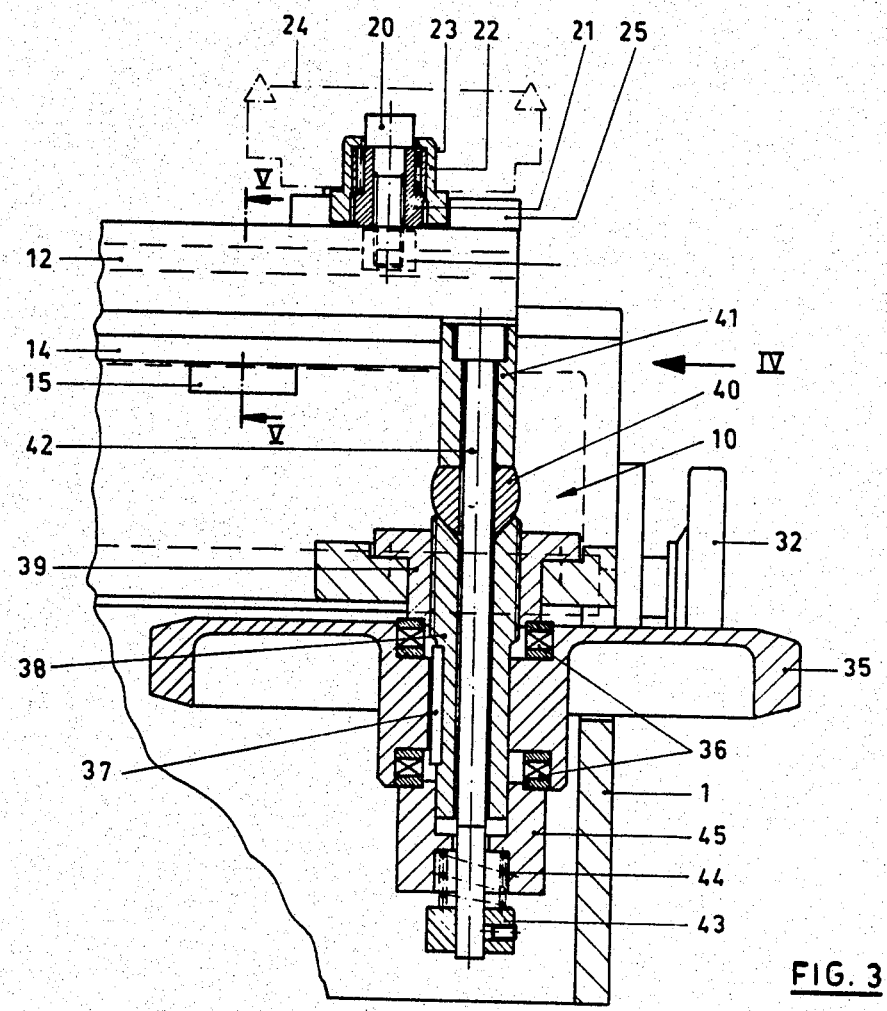
Figure 4:
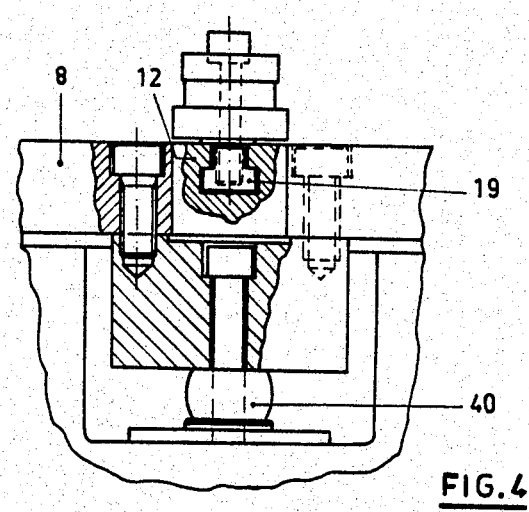
Figure 5:
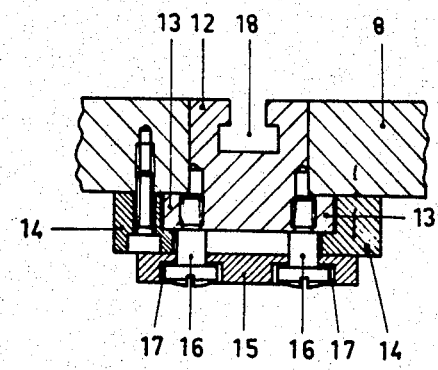
Figure 6:
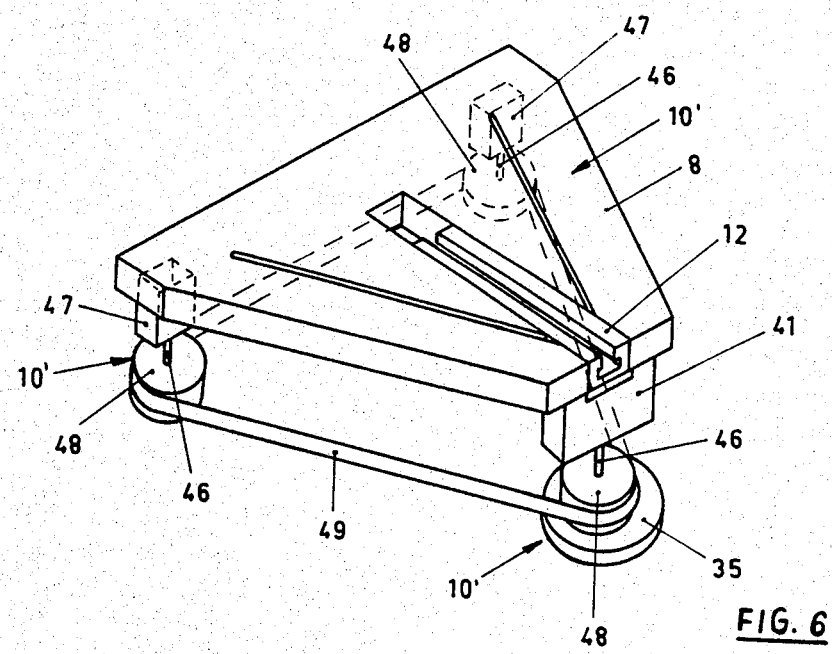
Figure 7:
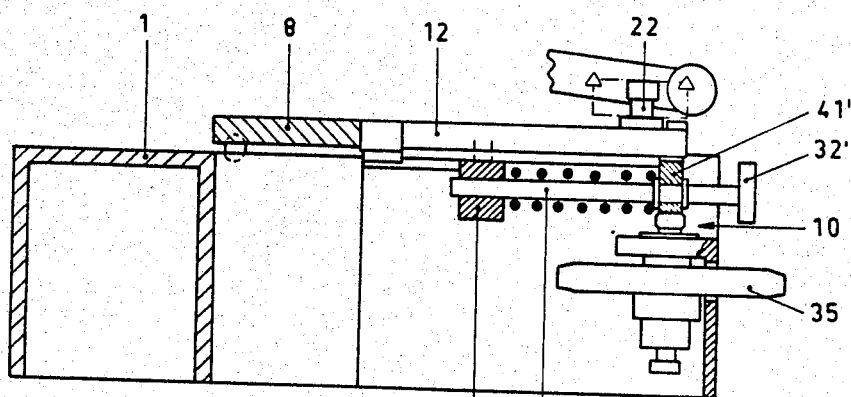

In the drawing:

FIG. 1 shows a setting device for cutter heads in a top view;

FIG. 2 the device according to FIG. 1 in a longitudinal section,

FIG. 3 an enlarged partial section along the line III—III in FIG. 1,

FIG. 4 a view, partially in section, in the direction of the arrow IV in FIG. 3 and FIG. 5 a partial section along the line V—V in FIG. 3, FIG. 6 in a simplified perspective view a modified form of embodiment in which the support stage is supported on three vertical height adjusting devices, which may be actuated together and FIG. 7 in a section similar to that of FIG. 2, a further form of embodiment, in which the threaded spindle for the adjustment of the forward displacement of the lock rail is protruding from the setting device and is carrying the associated adjusting wheel.

The setting device for cutter heads has an essentially box shaped base mounting frame 1, which carries on its top side an optical scanning apparatus. The optical scanning apparatus comprises a projection light source 2, mounted on the frontal side of the device and emitting a beam of light 3 indicated in FIG. 1 by a dot-and-dash line and passing a measuring point 4, whereupon it impacts a projection screen 6 after deflection by mirrors or prisms 5, said screen 6 being arranged over the base frame 1. The projection screen 6 carries a graticule (not shown). On the projection screen 6, the profile of a milling cutter bit 7 is reproduced; it is then located at the measuring point 4. The enlargement of the projection is for example 50x.

On the upper side of the base frame 1, an approximately triangular support stage 8 is pivotingly supported in two bearing points 9, with the connecting line of the two bearing points 9 forming the horizontal pivoting axis of the support stage 8. Under the measuring point 4, the support stage 8 is resting on a height adjusting device 10, which shall be explained in more detail hereinbelow with reference to FIG. 3.

A lock rail 12 is guided in a slot 11 of the support stage 8 extending in the direction of the light beam 3. As seen in FIG. 5, the lock rail 12 engages with lateral projections 13 the bottom side of the support stage 8. Guide beads 14 mounted on the support stage 8 engage the lateral projections 13 of the lock rail 12. A bearing plate 15 is being pressured by means of screws 16 screwed into the lock rail 12 and spring washers 17 from below against the beads 14.

The lock rail 12 has a longitudinal T groove 18, in which a T shaped block 19 is located. A screw 20 screwed into the clamping block 19 fastens a bearing body 21 in any position chosen on the lock rail 12 (FIG. 3 and 4). A rotatable cutter head holder 22 is rotatingly mounted on the bearing body 21. On its outer side, the rotatable cutter head holder 22 has a short cylindrical or spherical section 23 which fits into the bore of a cutter head 24 to be mounted; the latter is indicated in FIG. 1, 2 and 3 by a dash-and-dot line.

A support body 25 is arranged on the front end of the lock rail 12, adjacently to the cutter head holder 23. Two further support bodies 25 may be displaced in grooves 26 of the support stage 8, arranged radially with respect to the measuring point 4 and at an angle in relation to each other, said support bodies being clampable in said grooves. In FIG. 1, the arrangement of the support bodies 25 and the cutter head holder 23 is shown for a cutter head 24 of the smallest possible diameter. The largest possible diameter of a cutter head to be mounted is indicated in FIG. 1 by a dash-and-dot line 24'. It is seen that the measuring point 4 is unchanged for all cutter head diameters.

A threaded nut 27 is fastened to the under side of the lock rail 12 (FIG. 2), which engages an adjusting threaded spindle 28 located under the support stage 8. The threaded spindle 28 is supported in a bearing 29 on the support stage 8 and is connected by means of a belt drive 30 with an adjusting shaft 31 bearingly supported in the base frame 1 and leading to an adjusting hand wheel 32 on the frontal side of the device. The threaded nut 27 is further elastically supported on an abutment 34 joined with the support stage by means of a compression spring 34. By rotating the hand wheel 32, by means of the threaded spindle 28, a radial displacement of the lock rail 12 and thus of the cutter head holder 23, is obtained.

The device 10 for the adjustment in height of the support stage 8 has an adjusting hand wheel 35 accessible from the front side of the device, said hand wheel being supported on the base frame 1 by means of axial bearings 26. By means of a feather key 37, the hand wheel 35 is connected rotatingly with a threaded bushing 38, which is engaging a threaded nut 39 mounted on the frame. At the upper end of the threaded sleeve 38, a bearing ball 40 supports a bridge 41, which is joined by screwing on either side of the slot 11 to the support stage 8 (FIG. 4).

A center screw 42 clamps the bridge 41 by means of an adjusting ring 43 and a compression spring 44 to an abutment 45 mounted on the frame, thereby maintaining the ball 40 in engagement with the associated bearing surface on the upper end of the threaded sleeve 38.

To establish a zero setting for different cutter heads initially an annular gauge is placed onto the rotatable cutter head holder 22, which may be replaced to adapt it to different bore diameters, by releasing the screw 20.

By means of the hand wheels 32 and 35, the radial and height settings are effected until the edge of the gauge corresponding to the edge of the cutter head is located at the measuring point 4, i.e. until said edge is reproduced in the zero point of the graticule on the projection screen 6. The apparatus is now calibrated for this height and this diameter and the gauge is removed.

Subsequently, the cutter head to be set is inserted so that it is abutting with its rear side against the three support bodies 25 and is accepted with its bore on the section 23 of the cutter head holder 22. The cutter head is now rotated on the cutter head holder 22, until the first cutter edge to be set is in the optical focusing range. The setting of the bit edge is then effected so that the cutter edges to be set are in the desired position in relation to the graticule of the projection screen 6. Finally, the cutter head is rotated until the next edge to be set appears focused on the projection screen 6.

For the setting of certain predetermined edge angles, the graticule may be mounted on the screen in a rotating manner. It is further possible to provide additional lines adjacent to the graticule, provide interchangeable projection screens or to mount different foils interchangeably on the projection screen 6.

As indicated in FIG. 1 and 2, the pivoting bearings of the support stage 8 may consists of spherical bearings, but it is also possible to equip one or both of these bearings with cylindrical bearing bodies.

The support bodies 25 are preferably mounted interchangeably on the support stage 8 or the lock rail 12, respectively; they are replaced by support bodies of different heights, if a cutter head with a different thickness is to be mounted. Similarly, the rotating cutter head holder 22 is readily replaced in order to achieve adaptation to different cutter head bore and different dimensions of the cutter heads to be mounted.

FIG. 6 shows a form of embodiment modified with respect to the embodiment of FIG. 1–5. The support stage 8 is resting here on three height adjusting devices 10', each of which has a threaded spindle 46. The threaded spindle 46 is connected by means of a supporting block 47 at the two rear supports of the support stage 8 and the bridge 41 with the support stage 8.

All three threaded spindles 46 engage a wheel 48 provided with internal threads, said wheel being mounted in the base frame rotatingly, but stationarily in the axial direction. All three wheels 48 are connected with each other by means of a drive without play, for example a toothed belt 49 or a chain. The wheel 48 located on the front side of the machine is connected with the adjusting hand wheel 35. If the hand wheel 35 is rotated, all three wheels 48 are turned synchronously so that all of the threaded spindles 46 are screwed uniformly upwards or downwards, in order to uniformly raise or lower the support stage 8. For the sake of simplified representation, in FIG. 6 the rotating cutter head holder 22 and the support bodies 25 are eliminated.

FIG. 7 shows a modification with respect to the adjusting drive for the lock rail 12. The threaded spindle 28', engaging the threaded nut 27 mounted on the lock rail 12, is in this form of embodiment in the bridge 41' in an axial bearing and extends forward from the front side of the setting device. There, the threaded spindle 28' carries the adjusting hand wheel 32'. The belt drive 30 and the adjusting shaft 31 of the embodiment according to FIG. 1-5 are eliminated.

I claim:

1. Setting device for cutter heads with a rotatably supported cutter head with a base mounting frame and an optical scanning apparatus detecting the profile of a bit edge at a measuring point and being provided with a projection screen, the improvement wherein
   (a) the optical scanning apparatus is arranged stationarily on the base frame, with an approximately horizontal direction of the optical beam;
   (b) a support state is guided in the base frame in a height adjustable manner;
   (c) means provided for adjusting the height of the support stage;
   (d) the rotatable cutter head holder is displaceable in the support stage in relation to the measuring point; and
   (e) three support bodies for the rear side of the cutter head are carried by the support stage.

2. Setting device according to claim 1, characterized in that a pivotal mounting mounts the support stage for pivotal movement around a horizontal axis located at a distance from the measuring point.

3. Setting device according to claim 2, characterized in that the support stage is connected below the measuring point to the height adjusting device.

4. Setting device according to claim 1, characterized in that the rotatable cutter head holder and at least two of the three support bodies are guided displaceably in the support stage.

5. Setting device according to claim 4, characterized in that a lock rail is adjustably mounted in the support stage, an adjusting drive for adjusting the lock rail relative to the support stage and relative to the measuring point, the rotatable cutter head holder being displaceably mounted in the lock rail, and a clamp means for clamping the cutter head holder in adjusted positions in the lock rail.

6. Setting device according to claim 5 wherein the adjusting drive comprises a threaded adjusting spindle mounted on the support stage, a nut threadedly mounted on the lock rail and carried by the adjusting spindle, an adjusting shaft, and a belt drive operably connecting the adjusting shaft with the adjusting spindle.

7. Setting device according to claim 6, characterized by removable mounting means for mounting the rotatable cutter head holder.

8. Setting device according to claim 1, characterized by removable mounting means for mounting the support bodies.

9. Setting device according to claim 1, characterized in that the means for adjusting the height of the support stage comprises three height adjusting devices actuated together.

10. Setting device according to claim 5, characterized in that the adjusting drive for the lock rail comprises a threaded adjusting spindle mounted on the support stage, a nut threadedly carried by the adjusting spindle and connected to the lock rail, the adjusting spindle carrying a manual adjusting wheel.

11. Setting device according to claim 3, wherein the height adjusting device comprises a threaded adjusting sleeve.

* * * * *